US012374793B2

(12) United States Patent
Wu

(10) Patent No.: US 12,374,793 B2
(45) Date of Patent: Jul. 29, 2025

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 231 days.

(21) Appl. No.: 18/340,161

(22) Filed: Jun. 23, 2023

(65) Prior Publication Data

US 2023/0420846 A1 Dec. 28, 2023

Related U.S. Application Data

(63) Continuation of application No. PCT/CN2021/130976, filed on Nov. 16, 2021.

(30) Foreign Application Priority Data

Dec. 29, 2020 (CN) ......................... 202011603132.5

(51) Int. Cl.
*H01Q 5/35* (2015.01)
*H01Q 1/48* (2006.01)
*H01Q 5/335* (2015.01)

(52) U.S. Cl.
CPC ................. *H01Q 5/35* (2015.01); *H01Q 1/48* (2013.01); *H01Q 5/335* (2015.01)

(58) Field of Classification Search
CPC ............ H01Q 1/243; H01Q 1/36; H01Q 1/48; H01Q 1/50; H01Q 5/10; H01Q 5/328;
(Continued)

(56) References Cited

U.S. PATENT DOCUMENTS 9,992,312 B1 6/2018 Deng et al.
2002/0093456 A1 7/2002 Sawamura et al.
(Continued)

FOREIGN PATENT DOCUMENTS

CN 207781900 U 8/2018
CN 109390693 A 2/2019
(Continued)

OTHER PUBLICATIONS

European Search Report, European Patent Application No. 21913547.2, mailed Mar. 6, 2024 (40 pages).
(Continued)

*Primary Examiner* — Raymond R Chai
(74) *Attorney, Agent, or Firm* — Ladas & Parry LLP

(57) ABSTRACT

The present application provides an antenna assembly and an electronic device. The antenna assembly includes a first antenna and a second antenna. The first antenna includes a first radiator, a first signal source, and a first matching circuit, the first radiator has a first feed point, and the first signal source is electrically connected to the first matching circuit to the first feed point. The second antenna includes a second radiator, a third radiator, a second signal source, and a second matching circuit, the second radiator and the first radiator are spaced apart from and coupled to each other, the second radiator has a second feed point, the second signal source is electrically connected to the second matching circuit to the second feed point, and the second signal source is also electrically connected to the second matching circuit to the third radiator.

18 Claims, 12 Drawing Sheets

(58) Field of Classification Search
CPC ............ H01Q 5/335; H01Q 5/35; H01Q 5/50; H01Q 9/42; H01Q 21/0006; H01Q 21/28; H01Q 21/30
See application file for complete search history.

(56) References Cited

U.S. PATENT DOCUMENTS

| | | | | |
|---|---|---|---|---|
| 2007/0069956 | A1 | 3/2007 | Ozkar et al. | |
| 2018/0026348 | A1* | 1/2018 | Lee | H01Q 5/371 455/575.5 |
| 2019/0044218 | A1* | 2/2019 | Ye | H01Q 5/50 |
| 2019/0131694 | A1 | 5/2019 | Lee et al. | |

FOREIGN PATENT DOCUMENTS

| | | | | | |
|---|---|---|---|---|---|
| CN | 109921174 | A | | 6/2019 | |
| CN | 110247160 | A | | 9/2019 | |
| CN | 110380190 | A | | 10/2019 | |
| CN | 110380197 | A | | 10/2019 | |
| CN | 110380198 | A | | 10/2019 | |
| CN | 111628794 | A1 | | 9/2020 | |
| CN | 112086752 | A | | 12/2020 | |
| CN | 112751204 | A | | 5/2021 | |
| CN | 111370847 | B | * | 7/2021 | H01Q 1/244 |
| EP | 3584879 | A1 | | 12/2019 | |
| EP | 4270646 | A1 | * | 11/2023 | H01Q 1/243 |
| WO | WO-2019242577 | A1 | * | 12/2019 | |
| WO | 2020010923 | A1 | | 1/2020 | |
| WO | 2020119366 | A1 | | 6/2020 | |

OTHER PUBLICATIONS

Chinese First Office Action, Chinese Application No. 202011603132.5, mailed Dec. 2, 2022 (18 pages).
Notification to Grant Patent Right for Invention, Chinese Application No. 202011603132.5, mailed Mar. 30, 2023 (4 pages).
International Search Report, International Application No. PCT/CN2021/130976, mailed Feb. 10, 2022 (14 pages).

* cited by examiner

| | first signal source | second signal source |
|---|---|---|
| combination 1 | LB | MHB+UHB |
| combination 2 | LB+MB | HB+UHB |
| combination 3 | LB+HB | MB+UHB |
| combination 4 | LB+MHB | UHB |
| combination 5 | LB+UHB | MHB |

ANTENNA ASSEMBLY AND ELECTRONIC DEVICE

CROSS-REFERENCE TO RELATED APPLICATIONS

The present application is a continuation of International (PCT) Patent Application No. PCT/CN2021/130976 filed on Nov. 16, 2021, which claims priority to Chinese patent application No. 202011603132.5, filed on Dec. 29, 2020, the contents of all of which are hereby incorporated by reference.

TECHNICAL FIELD

The present disclosure relates to the technical field of communications, in particular to an antenna assembly and an electronic device.

BACKGROUND

With the development of technology, the popularity of electronic devices with communication functions such as mobile phones is increasing, and their functions are becoming increasingly powerful. The electronic device usually includes an antenna assembly so as to realize the communication function of the electronic device. However, in the related technology, the communication performance of the antenna assembly in the electronic device is not good enough, and the space to be promoted still exists.

SUMMARY OF THE DISCLOSURE

In a first aspect, the present disclosure provides an antenna assembly. The antenna assembly includes a first antenna and a second antenna. The first antenna includes a first radiator, a first signal source, and a first matching circuit. The first radiator has a first feed point. The first signal source is electrically connected to the first feed point through the first matching circuit. The second antenna includes a second radiator, a third radiator, a second signal source and a second matching circuit. The second radiator and the first radiator are spaced apart from each other and coupled to each other. The second radiator has a second feed point. The second signal source is electrically connected to the second feed point through the second matching circuit. The second signal source is also electrically connected to the third radiator through the second matching circuit. The first antenna and the second antenna jointly act to transmit and receive electromagnetic wave signals in at least a first frequency band range, a second frequency band range and a third frequency band range.

In a second aspect, the present disclosure also provides an electronic device including a circuit board, and the electronic device includes the antenna assembly according to the first aspect. One or more of the first signal source, the second signal source, the first matching circuit, and the second matching circuit is provided on the circuit board.

BRIEF DESCRIPTION OF THE DRAWINGS

In order to more clearly illustrate the technical solutions of the embodiments of the present disclosure, the accompanying drawings, which are intended to be used in embodiments, will be briefly described. Obviously, the drawings described below are some embodiments of the present disclosure, and for those of ordinary skill in the art, without creative effort, other drawings may be obtained according to these drawings.

DETAILED DESCRIPTION

Figure 1:
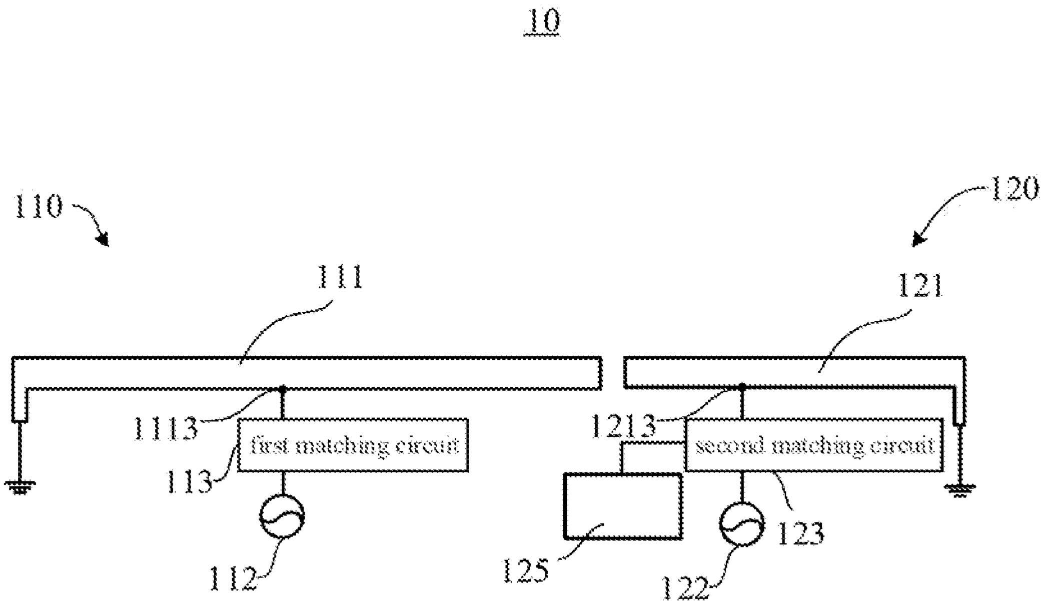
FIG. 1 is a schematic view of an antenna assembly in an embodiment of the present disclosure.

In a first aspect, the present disclosure provides an antenna assembly. The antenna assembly includes a first antenna and a second antenna. The first antenna includes a first radiator, a first signal source, and a first matching circuit. The first radiator has a first feed point. The first signal source is electrically connected to the first feed point through the first matching circuit. The second antenna includes a second radiator, a third radiator, a second signal source and a second matching circuit. The second radiator and the first radiator are spaced apart from each other and coupled to each other. The second radiator has a second feed point. The second signal source is electrically connected to the second feed point through the second matching circuit. The second signal source is also electrically connected to the third radiator through the second matching circuit. The first antenna and the second antenna jointly act to transmit and receive electromagnetic wave signals in at least one of a first frequency band range, a second frequency band range and a third frequency band range.

In some embodiments, the first antenna is configured to transmit and receive electromagnetic wave signals in a first frequency band range, and the second antenna is configured to transmit and receive electromagnetic wave signals in a second frequency band range and a third frequency band range, wherein the first frequency band range includes a LB frequency band, the second frequency band range includes a MHB frequency band, and the third frequency band range includes an UHB frequency band.

In some embodiments, the antenna assembly has a first resonance mode, a second resonance mode, a third resonance mode and a fourth resonance mode to cover the transceiving of the electromagnetic wave signal in the second frequency band range and the third frequency band range.

In some embodiments, at least one of the first resonance mode, the second resonance mode, the third resonance mode, and the fourth resonance mode is generated by the third radiator; and at least one another resonance mode is generated by coupling a portion of the first radiator with a signal from the second radiator.

In some embodiments, the first antenna further includes a first adjusting circuit used for adjusting the grounding impedance of the electromagnetic wave signals in the second frequency band range and the third frequency band range.

In some embodiments, one end of the first adjusting circuit is grounded, and the other end of the first adjusting circuit is electrically connected to the first matching circuit. Alternatively, the first radiator also has a first grounding end, a first free end and a first connection point; the first grounding end is grounded, the first connection point and the first feed point are arranged at intervals, and are arranged between the first free end and the first grounding end; one end of the first adjusting circuit is grounded, and the other end of the first adjusting circuit is electrically connected to the first connecting point; and the second radiator also includes a second grounding end and a second free end, the second grounding end is grounded, and the second free end and the first free end are opposite to each other.

In some embodiments, when one end of the first adjusting circuit is grounded and the other end of the first adjusting circuit is electrically connected to the first connecting point, the first connecting point is arranged between the first grounding end and the first feeding point, or the first connecting point is arranged between the first feeding point and the first free end.

In some embodiments, when one end of the first adjusting circuit is grounded, and the other end is connected to the first connection point, the first resonance mode is generated from a second grounding end of the second radiator to the second free end. The second resonance mode is generated from the first connection point of the first adjusting circuit and the first radiator to the first free end. The third resonance mode is generated from the second feed point of the second radiator to the second free end. The third radiator generates the fourth resonance mode.

In some embodiments, the first resonance mode is a fundamental mode that the second antenna operates from the second grounding end to the second free end of the second radiator. The second resonance mode is the fundamental mode that the first antenna operates from the first connection point of the first adjusting circuit and the first radiator to the first free end. The third resonance mode is the fundamental mode that the second antenna operates from the second feed point of the second radiator to the second free end. The fourth resonance mode is the fundamental mode that the second antenna operates in the third radiator.

In some embodiments, the first adjusting circuit is further used for switching the frequency band supported by the first antenna in the first frequency band range.

In some embodiments, the first adjusting circuit includes a plurality of sub-adjusting circuits and a switch unit. The switch unit is electrically connected to the first connection point. The switch unit further electrically connects the plurality of sub-adjusting circuits to ground. The switch unit electrically connects at least one sub-adjusting circuit of the plurality of sub-adjusting circuits to the first connection point under the control of a control signal.

In some embodiments, the second sub-adjusting circuit includes a combination of at least one or more of capacitance, inductance, and resistance.

In some embodiments, the frequency band supported in the first frequency band range includes a B28 frequency band, a B20 frequency band, a B5 frequency band and a B8 frequency band. The first adjusting circuit is used for enabling the first antenna to operate in any one of the B28 frequency band, the B20 frequency band, the B5 frequency band and the B8 frequency band, and can be switched in the B28 frequency band, the B20 frequency band, the B5 frequency band and the B8 frequency band.

In some embodiments, the second antenna further includes a second adjusting circuit, and the second adjusting circuit is used for switching frequency bands supported by the second antenna in the second frequency band range and the third frequency band range.

In some embodiments, one end of the second adjusting circuit is grounded and the other end is electrically connected to the second matching circuit. Alternatively, the second radiator includes a second grounding end, a second free end, a second feed point, and a second connection point. The second grounding end is grounded, the second free end and the first radiator are arranged at intervals. The second connecting point and the second feeding point are arranged at intervals and are both arranged between the second free end and the second grounding end. One end of the second adjusting circuit is grounded, and the other end of the second adjusting circuit is electrically connected to the second connecting point.

In some embodiments, when one end of the second adjusting circuit is grounded and the other end is electrically connected to the second connecting point, the second connecting point is arranged between the second grounding end and the second feeding point, or the second connecting point is arranged between the second free end and the second feeding point.

In some embodiments, the first antenna is configured to transmit and receive electromagnetic wave signals in the first frequency band range and the second frequency band range. The second antenna is configured to receive and transmit electromagnetic wave signals in the third frequency band range and the fourth frequency band range. The first frequency band range includes a LB frequency band, the second frequency band includes an MB frequency band, the third frequency band includes an UHB frequency band, and the fourth frequency band includes an HB frequency band. Alternatively, the first antenna is configured to transmit and receive electromagnetic wave signals in the first frequency band range and the fourth frequency band range, and the second antenna is configured to transmit and receive electromagnetic wave signals in the second frequency band range and the fourth frequency band range. Alternatively, the first antenna is configured to transmit and receive electromagnetic wave signals in the first frequency band range and the second frequency band range, and the second antenna is configured to transmit and receive electromagnetic wave signals in the third frequency band range. Alternatively, the first antenna is configured to transmit and receive electromagnetic wave signals in the first frequency band range and the third frequency band range, and the second antenna is configured to transmit and receive electromagnetic wave signals in the second frequency band range. The first frequency range includes the LB frequency range, the second frequency range includes the MB frequency range, the third frequency range includes the UHB frequency range, and the fourth frequency range includes the HB frequency range.

In some embodiments, the first adjusting circuit and the second adjusting circuit are co-modulated, so that the first antenna and the second antenna are jointly used for realizing ENDC or CA of the first frequency band range, the second frequency band range and the third frequency band range.

In some embodiments, the first antenna further includes a fourth radiator. The fourth radiator is electrically connected to the first matching circuit, and the fourth radiator is configured to generate at least one resonance mode.

In a second aspect, the present disclosure provides an electronic device including the antenna assembly of any one of the first aspect.

The following will be combined with the accompanying drawings in the embodiments of the present disclosure, the technical solutions in the embodiments of the present disclosure are clearly and completely described. Obviously, the described embodiments are merely a part of the embodiments of the present disclosure, and not all embodiments. Based on the embodiments in present disclosure, all other embodiments obtained by those of ordinary skill in the art without creative labor are within the scope of protection in present disclosure.

Reference herein to an "embodiment" means, particular features, structures, or characteristics described in connection with embodiments may be included in at least an embodiment of the present disclosure. The phrase appearing in various positions in the specification does not necessarily refer to the same embodiment, nor is it an independent or alternative embodiment that is mutually exclusive with other embodiments. Technicians in this field explicitly and implicitly understand that the embodiments described in present disclosure can be combined with other embodiments.

The present disclosure provides an antenna assembly 10. The antenna assembly 10 can be applied to an electronic device 1. The electronic device 1 includes but is not limited to an electronic device with communication function, such as a mobile phone, a mobile internet device (MID), an e-book, a Play Station Portable (PSP), a Personal Digital Assistant (PDA), or the like.

Referring to FIG. 1, FIG. 1 is a schematic view of an antenna assembly 10 according to an embodiment of the present disclosure. The antenna assembly 10 includes a first antenna 110 and a second antenna 120. The first antenna 110 includes a first radiator 111, a first signal source 112, and a first matching circuit 113. The first radiator 111 has a first feed point 1113. The first signal source 112 is electrically connected to the first feed point 1113 through the first matching circuit 113. The second antenna 120 includes a second radiator 121, a third radiator 125, a second signal source 122, and a second matching circuit 123. The second radiator 121 and the first radiator 111 are spaced apart from each other and coupled to each other. The second radiator 121 has a second feed point 1213. The second signal source 122 is electrically connected to the second feed point 1213 through the second matching circuit 123, and the second signal source 122 is further electrically connected to the third radiator 125 through the second matching circuit 123. The first antenna 110 and the second antenna 120 cooperate to transmit and receive electromagnetic wave signals of at least a first frequency band range, a second frequency band range and a third frequency band range.

The terms "first", "second", etc. in the specification and claims of present disclosure, as well as the accompanying drawings, are used to distinguish different objects, rather than to describe a specific order. In addition, the terms "comprising", "including" and "having", as well as any variations of them, are intended to cover non-exclusive inclusions. The fact that the antenna assembly 10 includes the first antenna 110 and the second antenna 120 does not exclude the fact that the antenna assembly 10 also includes other antennas besides the first antenna 110 and the second antenna 120.

The signal source refers to the device that generates an excitation signal. When the first antenna 110 is configured to receive an electromagnetic wave signal, the first signal source 112 generates a first excitation signal, and the first excitation signal is loaded onto the first feed point 1113 through the first matching circuit 113, thereby causing the first radiator 111 to radiate the electromagnetic wave signal. When the second antenna 120 is configured to receive the electromagnetic wave signal, the second signal source 122 generates a second excitation signal, and the second excitation signal is loaded onto the second feed point 1213 through the second matching circuit 123, such that the second radiator 121 receives and transmits the electromagnetic wave signal and the third radiator 125 receives and transmits the electromagnetic wave signal.

The first radiator 111 may be a flexible printed circuit (FPC) antenna radiator, a laser direct structuring (LDS) antenna radiator, a print direct structuring (PDS) antenna radiator, or a metal branch. The second radiator 121 may be the FPC antenna radiator, the LDS antenna radiator, the PDS antenna radiator, or the metal branch. The third radiator 125 may be the FPC antenna radiator, the LDS antenna radiator, the PDS antenna radiator, or the metal branch. The types of the first radiator 111, the second radiator 121 and the third radiator 125 can be the same or different.

In the antenna assembly 10 of the present embodiment, the second radiator 121 and the first radiator 111 are spaced apart from each other and coupled to each other. That is, the first radiator 111 and the second radiator 121 have the same caliber. Due to the coupling action of the first radiator 111 and the second radiator 121, when the first antenna 110 operates, not only the first radiator 111 is utilized to receive and transmit electromagnetic wave signals, electromagnetic wave signals are also transmitted and received by the second radiator 121, thereby enabling the first antenna 110 to operate in a wide frequency band. Similarly, when the second antenna 120 operates, not only can the second radiator 121 be configured to transmit and receive electromagnetic wave signals, but also the first radiator 111 can be configured to transmit and receive electromagnetic wave signals, so that the second antenna 120 can operate in a wider frequency band. In addition, since the first antenna 110 can utilize not only the first radiator 111 but also the second radiator 121 to transmit and receive electromagnetic wave signals during operation, the second antenna 120 can utilize not only the second radiator 121 but also the first radiator 111 during operation. Therefore, the multiplexing of the radiators in the antenna assembly 10 and the spatial multiplexing are achieved, which is beneficial for reducing the size of the antenna assembly 10. From the above analysis, it can be seen that the size of the antenna assembly 10 is small, and when the antenna assembly 10 is applied to the electronic device 1, it is easy to stack with other devices of the electronic device 1. The second radiator 121 and the third radiator 125 of the second antenna 120 in the antenna assembly 10 share the second matching circuit 123. Thus, when the second antenna 120 receives and transmits electromagnetic wave signals, not only can the second radiator 121 be used for receiving and transmitting the electromagnetic wave signals, but also the third radiator 125 can be used for receiving and transmitting the electromagnetic wave signals, so that the second antenna 120 can support the receiving and transmitting of the electromagnetic wave signals in multiple frequency bands.

The second radiator 121 and the first radiator 111 are spaced apart from each other and coupled to each other, specifically means, mutual coupling of the first radiator 111 and the second radiator 121 is achieved by the "caliber-to-caliber" design of the first radiator 111 and the second radiator 121. The "caliber-to-caliber" design is also called common caliber design. The "caliber" in the "caliber-to-caliber" is the radiation aperture of the antenna. That is, the radiation aperture of the first radiator 111 is opposite to the radiation aperture of the second radiator 121. The common caliber design of the first radiator 111 and the second radiator 121 can improve the multiplexing rate of the first antenna 110 and the second antenna 120, and stimulate more resonant modes (also known as resonant mode states) through the mutual coupling of the first radiator 111 and the second radiator 121 of "caliber-to-caliber" design, thereby utilizing fewer antenna branches to achieve more resonant modes.

In an embodiment, the first antenna 110 is configured to transmit and receive electromagnetic wave signals in the first frequency band range, and the second antenna 120 is configured to transmit and receive electromagnetic wave signals in the second frequency band range and the third frequency band range. The first frequency band range includes a Lower Band (LB) frequency band, the second frequency band range includes a Middle High Band (MHB) frequency band, and the third frequency band range includes an Ultra High Band (UHB) frequency band.

The LB frequency band refers to a frequency band with a frequency lower than 1000 MHz. The range of MHB frequency band is 1000 MHz-3000 MHz. The range of the UHB frequency band is 3000 MHz to 6000 MHz.

In other embodiment, the first antenna 110 and the second antenna 120 also support transceiving of electromagnetic wave signals in other frequency band ranges. The situation where the first antenna 110 and the second antenna 120 in other embodiments support electromagnetic wave signals in other frequency bands will be described in detail later as follows.

Figures 2, 3:
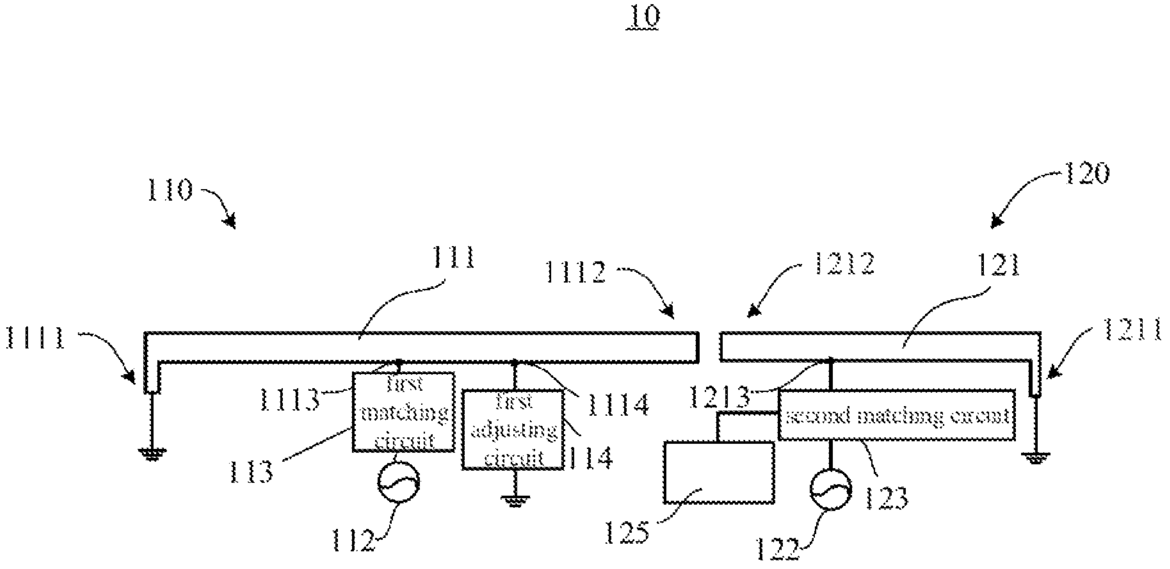
FIG. 2 is a table of transceiving electromagnetic wave signals supported by the antenna assembly in an embodiment of the present disclosure.
FIG. 3 is a schematic view of the antenna assembly in another embodiment of the present disclosure.

Referring to FIG. 2, FIG. 2 is a table of transceiving electromagnetic wave signals supported by the antenna assembly in an embodiment of the present disclosure. In this table, combination 1 indicates that the first antenna 110 is configured to transmit and receive electromagnetic wave signals in the first frequency range, and the second antenna 120 is configured to transmit and receive electromagnetic wave signals in the second frequency range and the third frequency range. The combination 2 indicates that the first antenna 110 is configured to transmit and receive electromagnetic wave signals in the first frequency band range and the second frequency band range, the second antenna 120 is configured to transmit and receive electromagnetic wave signals in the third frequency band range and the fourth frequency band range. The first frequency band range includes the LB frequency band range, the second frequency band includes the middle band (MB) frequency band, the third frequency band includes the UHB frequency band, the fourth frequency band includes the HB band. The combination 3 indicates that the first antenna 110 is configured to transmit and receive electromagnetic wave signals in the first frequency band range and the fourth frequency band range, the second antenna 120 is configured to transmit and receive electromagnetic wave signals in the second frequency band range and the fourth frequency band range. The combination 4 indicates that the first antenna 110 is configured to transmit and receive electromagnetic wave signals in the first frequency band range and the second frequency band range, the second antenna 120 is configured to transmit and receive electromagnetic wave signals in the third frequency band range. The combination 5 indicates that the first antenna 110 is configured to transmit and receive electromagnetic wave signals in the first frequency band range and the third frequency band range, the second antenna 120 is configured to transmit and receive electromagnetic wave signals in the second frequency band range. In the combination 1 to combination 5 described above, the first frequency band range includes the LB frequency band, the second frequency band range includes the MB frequency band, the third frequency band range includes the UHB frequency band, and the fourth frequency band range includes the high band (HB) frequency band.

In the next embodiment, the first antenna 110 is configured to transmit and receive electromagnetic wave signals in the first frequency band range, and the second antenna 120 is configured to transmit and receive electromagnetic wave signals in the second frequency band range and the third frequency band range, which is taken as an example.

In this embodiment, the antenna assembly 10 has a first resonance mode, a second resonance mode, a third resonance mode, and a fourth resonance mode to cover transceiving of electromagnetic wave signals in the second frequency band range and the third frequency band range.

At least one of the first resonance mode, the second resonance mode, the third resonance mode, and the fourth resonance mode is generated by the third radiator (hereinafter referred to as the fourth resonance mode), at least another resonance mode is generated by coupling a portion of the first radiator 111 with a signal from the second radiator 121 (hereinafter referred to the second resonance mode). Each resonance mode will be described later in conjunction with a simulated schematic view of the antenna assembly 10.

Figure 4:
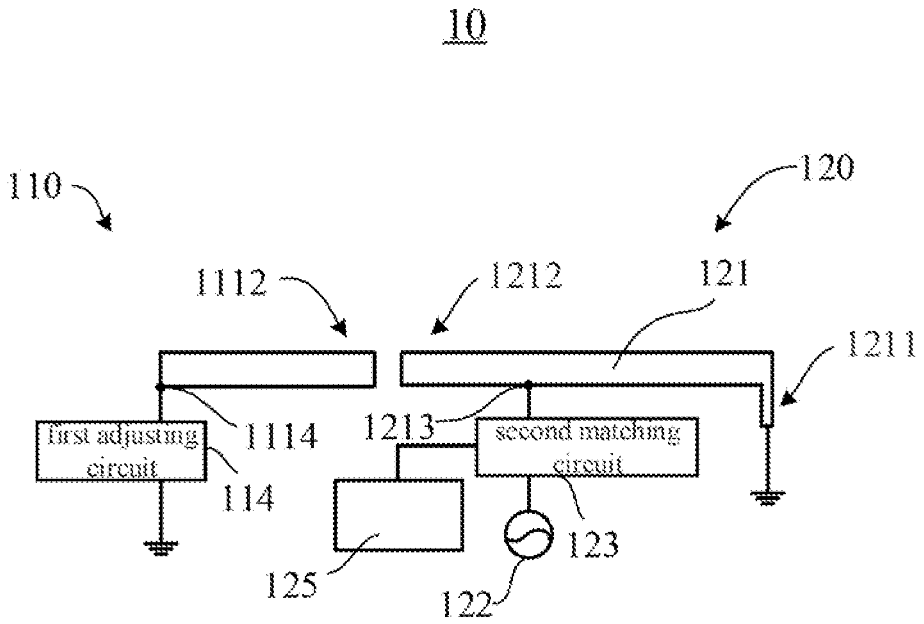
FIG. 4 is an equivalent schematic view that the first adjusting circuit in FIG. 3 implements the low impedance of the second frequency band range and the third frequency band range to ground.

Referring to FIG. 1, FIG. 3 and FIG. 4, FIG. 3 is a schematic view of the antenna assembly in another embodiment of the present disclosure, and FIG. 4 is an equivalent schematic view that the first adjusting circuit in FIG. 3 implements the low impedance of the second frequency band range and the third frequency band range to ground. The first antenna 110 also includes a first adjusting circuit 114 for implementing a low impedance to ground of electromagnetic wave signals in the second frequency range and the third frequency range.

The first adjusting circuit 114 realizes the impedance to the ground of electromagnetic wave signals in the second frequency band range and the third frequency band range. In other words, the first adjusting circuit 114 achieves the low impedance of the electromagnetic wave signal to ground in the second frequency range and the third frequency range. The radiator between the connection point of the first radiator 111 and the first adjusting circuit 114 to the grounding end (the first grounding end 111) of the first radiator 111 is equivalent to zero. The equivalent antenna assembly 10 is shown in FIG. 4, which will be introduced later in conjunction with the simulation diagram of the S parameter.

In this embodiment, the first radiator 111 further has a first grounding end 1111, a first free end 1112 and a first connection point 1114. The first grounding end 1111 is grounded. The first connection point 1114 and the first feed point 1113 are spaced apart from each other and are both arranged between the first free end 1112 and the first grounding end 1111. One end of the first adjusting circuit 114 is grounded, and the other end is electrically connected to the first connection point 1114. The second radiator 121 further includes a second grounding end 1211 and a second free end 1212. The second grounding end 1211 is grounded, and the second free end 1212 and the first free end 1112 are spaced apart from each other. The second feed point 1213 is located between the second grounding end 1211 and the second free end 1212.

In this embodiment, the first connection point 1114 is located between the first feed point 1113 and the first free end 1112. In other embodiment (see FIG. 17), the first connection point 1114 is located between the first feed point 1113 and the first grounding end 1111.

Figure 5:
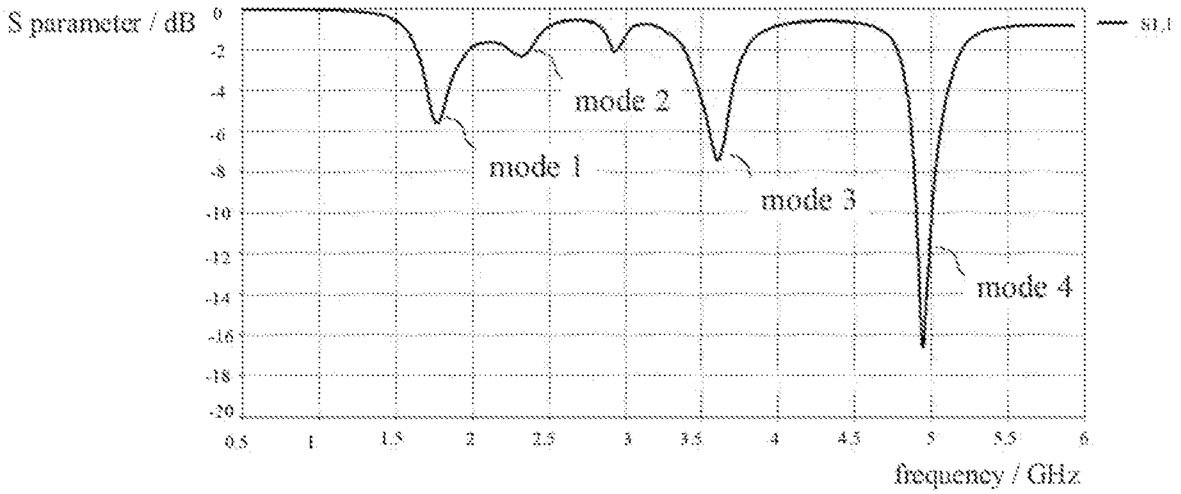
FIG. 5 is a simulation schematic illustration of some S parameters of the antenna assembly in FIG. 1.

Referring to FIG. 5, FIG. 5 is a simulation schematic illustration of some S parameters of the antenna assembly in FIG. 1. In the schematic illustration of the present embodiment, the horizontal axis represents the frequency in GHz, and the vertical axis represents the S parameter in dB. The first resonance mode (designated mode 1) is generated from the second grounding end 1211 to the second free end 1212 of the second radiator 121. The second resonance mode (designated mode 2) is generated from the first connection point 1114 of the first adjusting circuit 114 and the first radiator 111 to the first free end 1112. The third resonance mode (designated mode 3) is generated from the second feed point 1213 of the second radiator 121 to the second free end 1212. The third radiator 125 produces the fourth resonance mode (designated mode 4).

From the simulation diagram of the embodiment, it can be seen that the first resonance mode, the second resonance mode, the third resonance mode and the fourth resonance mode in the antenna assembly 10 can cover the receiving and transmitting of electromagnetic wave signals of the MHB frequency band and the UHB frequency band that is, the receiving and transmitting of the electromagnetic wave signals of the 1000 MHz to 6000 MHz frequency band are realized.

In an embodiment, the first resonance mode is the fundamental mode or the high order mode that the second antenna 120 operates from the second grounding end 1211 of the second radiator 121 to the second free end 1212. The second resonance mode is the fundamental mode or the high order mode that the first antenna 110 operates from the first connection point 1114 of the first adjusting circuit 114 and the first radiator 111 to the first free end 1112. The third resonance mode is the fundamental mode or the high order mode that the second antenna 120 operates from the second feed point 1213 of the second radiator 121 to the second free end 1212. The fourth resonance mode is the fundamental mode or the high order mode that the second antenna 120 operates in the third radiator 125.

In this embodiment, the first resonance mode is the fundamental mode that the second antenna 120 operates from the second grounding end 1211 of the second radiator 121 to the second free end 1212. The second resonance mode is the fundamental mode that the first antenna 110 operates from the first connection point 1114 of the first adjusting circuit 114 and the first radiator 111 to the first free end 1112. The third resonance mode is the fundamental mode that the second antenna 120 operates from the second feed point 1213 of the second radiator 121 to the second free end 1212. The fourth resonance mode is the fundamental mode that the second antenna 120 operates in the third radiator 125.

The first resonance mode is a quarter wavelength fundamental mode that the second antenna 120 operates from the second grounding end 1211 of the second radiator 121 to the second free end 1212. When the first resonance mode is the fundamental mode in which the second antenna 120 operates from the second grounding end 1211 of the second radiator 121 to the second free end 1212, the first resonance mode has a higher transmit-receive power.

When the second resonance mode is the fundamental mode that the first antenna 110 operates from the first connection point 1114 of the first adjusting circuit 114 and the first radiator 111 to the first free end 1112, the second resonance mode has a higher transmit-receive power.

When the third resonance mode is the fundamental mode that the second antenna 120 operates from the second feed point 1213 of the second radiator 121 to the second free end 1212, the third resonance mode has a higher transmit-receive power. When the fourth resonance mode is the fundamental mode that the second antenna 120 operates in the third radiator 125, the fourth resonance mode has a higher transmit-receive power.

When the first adjusting circuit 114 is electrically connected to the first connection point of the first radiator 111, the second resonance mode is activated, the first connection point 1114 may be disposed between the first feed point 1113 and the first free end 1112, or the first connection point 1114 may be disposed between the first feed point 1113 and the first grounding end 1111, so long as the length from the first free end 1112 to the first connection point 1113 is equal to ¼ wavelength, or approximately ¼ wavelength.

Figure 6:
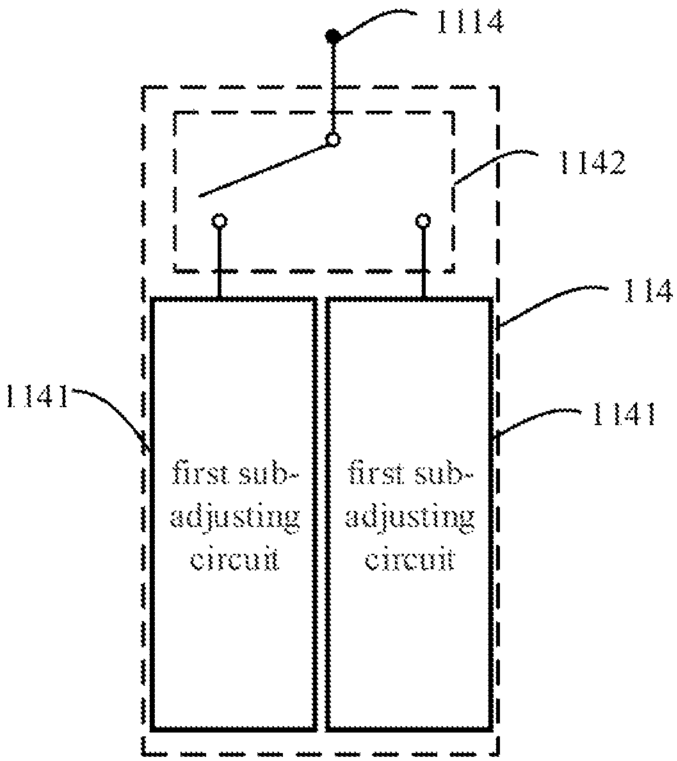
FIG. 6 is a schematic view of a first adjusting circuit in an embodiment of the present disclosure.

Referring to FIG. 6, FIG. 6 is a schematic view of the first adjusting circuit in an embodiment of the present disclosure. In an embodiment, the first adjusting circuit 114 includes a plurality of sub-adjusting circuits and a switching unit. For ease of description, the sub-adjusting circuits included in the first adjusting circuit 114 is named the first sub-adjusting circuit 1141. The switching unit in the first adjusting circuit 114 is named the first switching unit 1142. The first switching unit 1142 is electrically connected to the first connection point 1114, and the first switching unit 1142 also electrically connects the plurality of first sub-adjusting circuits 1141 to ground. The first switching unit 1142 electrically connects at least one of the first sub-adjusting circuits 1141 to the first connection point 1114 under the control of a control signal.

In the schematic view of the embodiment, taking two first sub-adjusting circuits 1141 as examples. The first switching unit 1142 is a single-pole double-throw switch, which is taken as an example. The movable end of the first switching unit 1142 is electrically connected to the first connection point 1114. A fixed end of the first switching unit 1142 is electrically connected to one of the first sub-adjusting circuits 1141 to ground. In other embodiments, the first adjusting circuit 114 includes N first sub-adjusting circuits 1141, the first switching unit 1142 is a single-pole N-throw switch, or the first switching unit 1142 is an N-pole N-throw switch.

Figure 7:
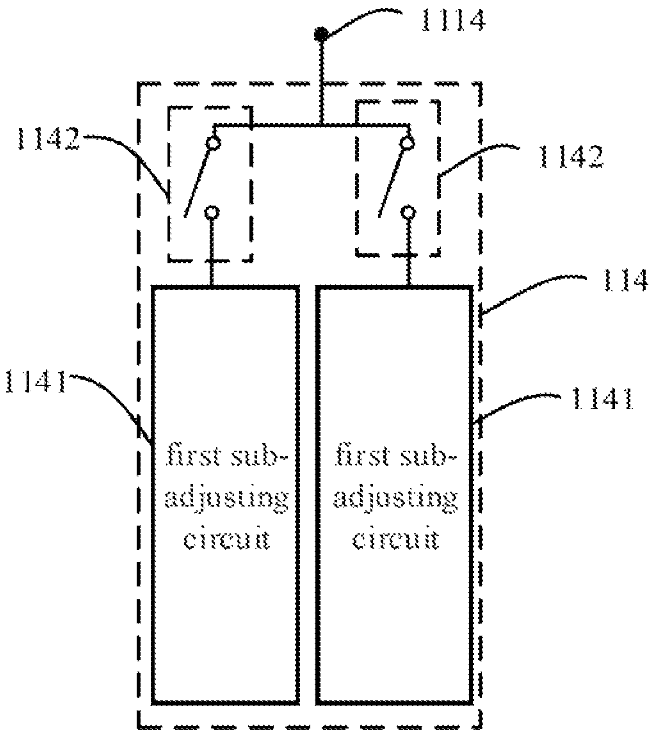
FIG. 7 is a schematic view of the first adjusting circuit provided in another embodiment of the present disclosure.

Referring to FIG. 7, FIG. 7 is a schematic view of the first adjusting circuit according to another embodiment of the present disclosure. In an embodiment, the first adjusting circuit 114 includes M first sub-adjusting circuits 1141 and M first switching units 1142, each first switching unit 1142 is connected in series with one first sub-adjusting circuit 1141.

The forms of the first sub-adjusting circuit 1141 of the first adjusting circuit 114 and the first switching unit 1142 are not limited to the several described above, as long as the first switching unit 1142 electrically connects at least one of the multiple first adjusting circuits 1141 to the first connection point 1114 under the control of the control signal.

The first sub-adjusting circuit 1141 includes at least one or more of a capacitance, inductance, and resistance. Thus, the first sub-adjusting circuit 1141 is also referred to as a lumped circuit.

Figure 8:
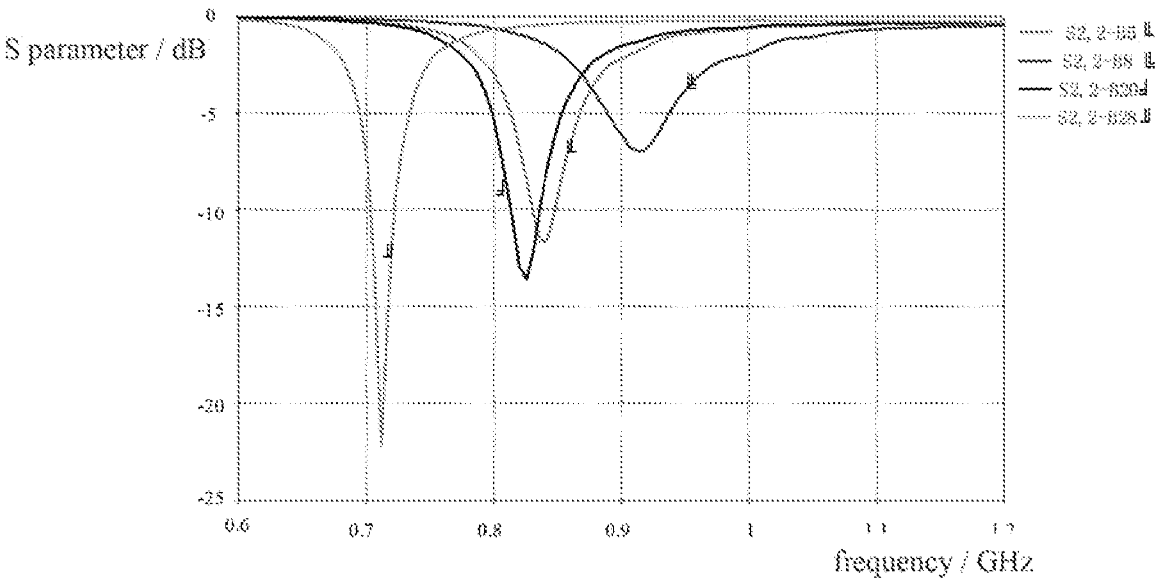
FIG. 8 is a simulation diagram of a first adjusting circuit for switching a frequency band supported by the first antenna in the first frequency band range.

Referring to FIG. 8, FIG. 8 is a simulation diagram of the first adjusting circuit for switching the frequency band supported by the first antenna in the first frequency band range. In the schematic illustration of the present embodiment, the horizontal axis represents the frequency in GHz, and the vertical axis represents the S parameter in dB. In the simulation diagram, curve ① is B5 frequency band, curve ② is B8 frequency band, curve ③ is B20 frequency band, and curve ④ is the B28 band. The first adjusting circuit 114 is further configured to switch the frequency band supported by the first antenna 110 in the first frequency band range. The frequency band supported in the first frequency band range includes the B28 frequency band, the B20 frequency band, the B5 frequency band, and the B8 frequency band. The first adjusting circuit 114 is configured to operate the first antenna 110 in any one of the B28 frequency band, the B20 frequency band, the B5 frequency band, and the B8 frequency band, and to be switchable in the B28 frequency band, the B20 frequency band, the B5 frequency band, and the B8 frequency band.

Figure 9:
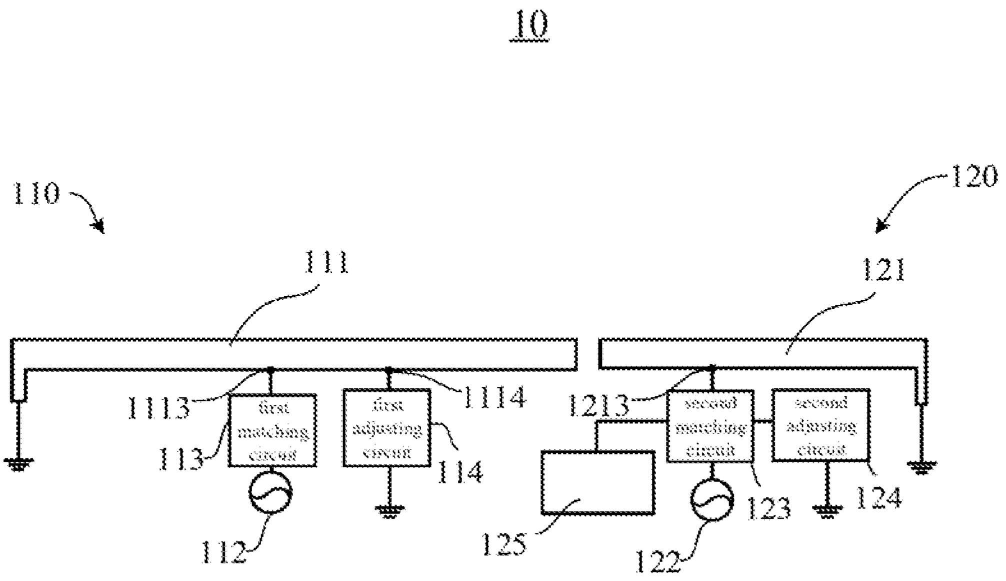
FIG. 9 is a schematic view of the antenna assembly in another embodiment of the present disclosure.

Referring to FIG. 9, FIG. 9 is a schematic view of the antenna assembly in another embodiment of the present disclosure. The second antenna 120 further includes a second adjusting circuit 124 for switching the frequency bands supported by the second antenna 120 within the second frequency band range and the third frequency band range.

The second antenna 120 also includes the second adjusting circuit 124 that may be incorporated into the antenna assembly 10 provided in any of the foregoing embodiments. Taking the schematic view of combining the second antenna 120 with the second adjusting circuit 124 into an embodiment as an example for explanation.

In the present embodiment, one end of the second adjusting circuit 124 is grounded, and the other end is electrically connected to the second matching circuit 123.

Figure 10:
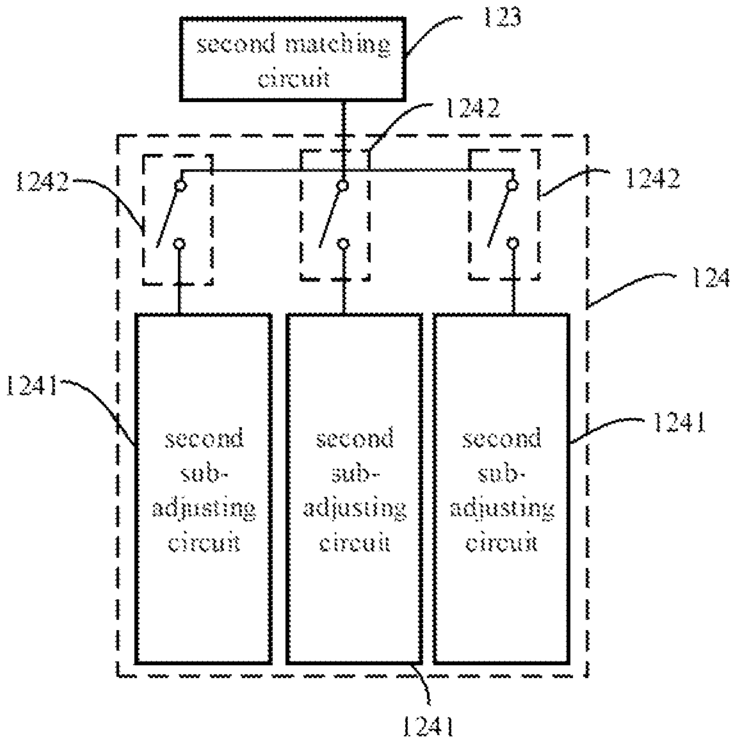
FIG. 10 is a schematic view of a second adjusting circuit in an embodiment of the present disclosure.

Referring to FIG. 10. FIG. 10 is a schematic view of the second adjusting circuit in an embodiment of the present disclosure. The second adjusting circuit 124 includes a plurality of sub-adjusting circuits and a switching unit. For ease of description, the sub-adjusting circuitry included in the second adjusting circuitry 124 is named as the second sub-adjusting circuit 1241, and the switching unit included in the second adjusting circuit 124 is named as the second switching unit 1242. The second switching unit 1242 is configured to electrically connect at least one of the multiple second sub-adjusting circuits 1241 of the second adjusting circuit 124 to the second matching circuit 123 under the control of the control signal. In the schematic view of this embodiment, taking three switches and three second sub-adjusting circuits 1241 of the second adjusting circuit 124 as examples, it is shown that each switch is electrically connected to one second sub-adjusting circuit 1241.

Figure 11:
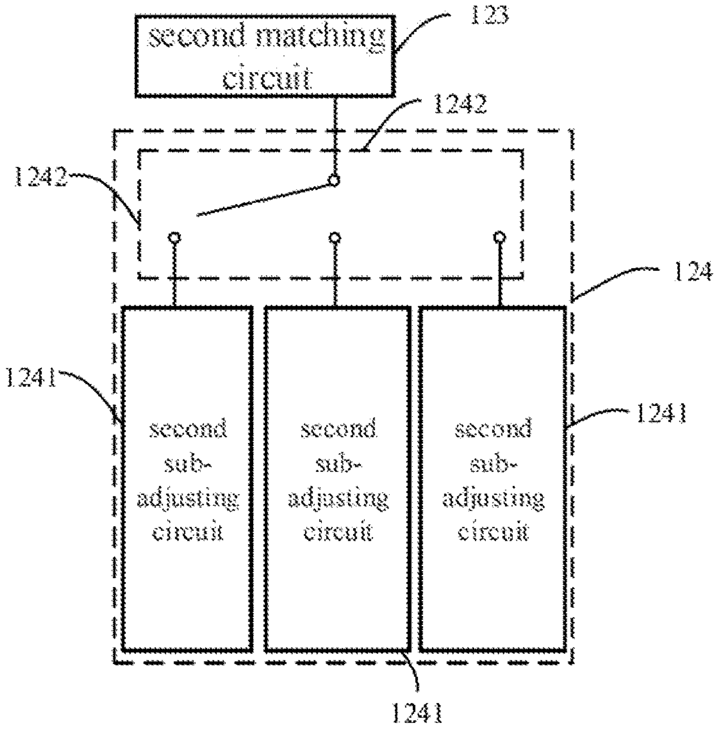
FIG. 11 is a schematic view of a second adjusting circuit in an embodiment of the present disclosure.

Referring to FIG. 11. FIG. 11 is a schematic view of the second adjusting circuit in an embodiment of the present disclosure. The second adjusting circuit 124 includes one single-pole triple-throw switch and three second sub-adjusting circuits 1241. The movable end of the single-pole triple-throw switch is electrically connected to the second matching circuit 123, the three fixed ends of the single-pole three-throw switch are electrically connected to three second sub-adjusting circuits 1241, respectively. In other embodiments, the second adjusting circuit 124 includes K second sub-adjusting circuits 1241, the second switching unit 1242 is a single-pole K-throw switch, or the second switching unit 1242 is a K-pole K-throw switch, wherein K is a positive integer greater than or equal to 2.

The second sub-adjusting circuit 1241 includes a combination of at least one or more of capacitance, inductance, and resistance. Thus, the second sub-adjusting circuit 1241 is also referred to as a lumped circuit. The second sub-adjusting circuit 1241 of the first adjusting circuit 114 may be the same as or different from the second sub-adjusting circuit 1241 of the second adjusting circuit 124.

Figure 12:
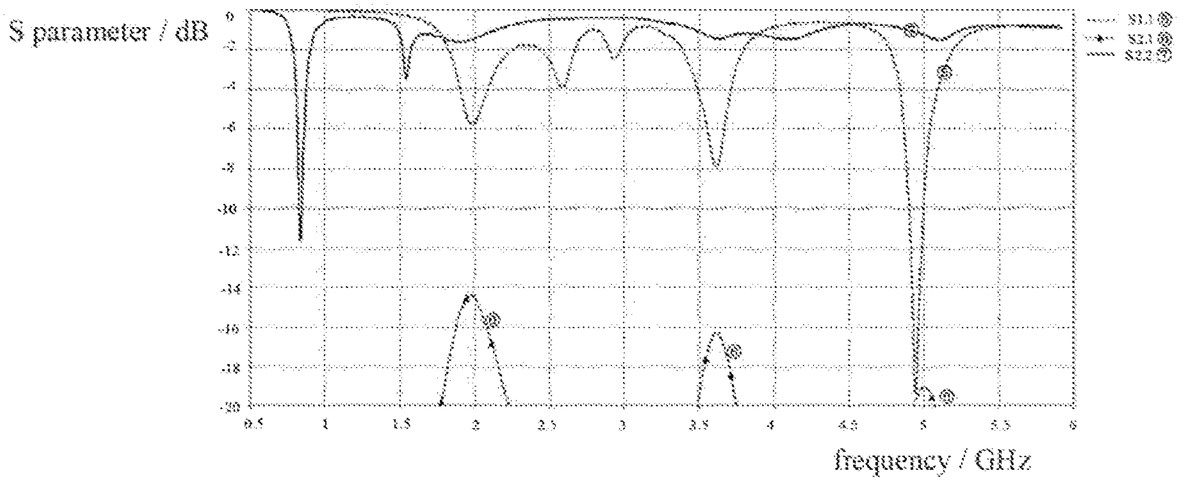
FIG. 12 is a simulation schematic view of the antenna assembly of FIG. 9.

Referring to FIG. 12, FIG. 12 is a simulation schematic view of the antenna assembly of FIG. 9. In the schematic illustration of the present embodiment, the horizontal axis represents the frequency in GHz, and the vertical axis represents the S parameter in dB. In this simulation diagram, curve ⑤ represents S1,1 parameter, curve ⑥ represents S2,1 parameter, curve ⑦ represents S2,2 parameter. It can be seen from the simulation diagram, the resonance frequency band of the curve (5) is the LB frequency band, the resonance frequency band of the curve (7) is the MHB frequency band and the UHB frequency band. From curve ⑥, it can be seen that the LB frequency band has a high degree of isolation from the MHB and UHB frequency bands, respectively. In the antenna assembly 10, the first antenna 110 and the second antenna 120 are jointly used for realizing LTE NR double connection (ENDC) and carrier aggregation (CA) of the first frequency band range, the second frequency band range and the third frequency band range.

Specifically, the first adjusting circuitry 114 and the second adjusting circuitry 124 are co-modulated such that the first antenna 110 and the second antenna 120 are jointly configured to implement ENDC or CA of the first frequency range, the second frequency range, and the third frequency range. For example, the first adjusting circuit 114 is configured to adjust the first frequency band range supported by the first antenna 110, if only the first adjusting circuit 114 is used, it is possible to deviate the frequency band range supported by the second antenna 120 from at least one of the second frequency band range and the third frequency band range, the second adjusting circuit 124 is configured to enable the second antenna 120 to support the receiving and transmitting of electromagnetic wave signals in the second frequency range and the third frequency range. If only the second adjusting circuit 124 is configured to enable the second antenna 120 to support the receiving and transmitting of electromagnetic wave signals in the second frequency range and the third frequency range, it is possible to deviate the frequency band range supported by the first antenna 110 from the first frequency band range, and the first adjusting circuit 114 is configured to enable the first antenna 110 to support the receiving and transmitting of electromagnetic wave signals in the first frequency band range. Thus, the first adjusting circuit 114 and the second adjusting circuit 124 need to be jointly adjusted to enable the first antenna 110 and the second antenna 120 to jointly achieve ENDC or CA in the first frequency band range, the second frequency band range and the third frequency band range.

In other words, the first antenna 110 and the second antenna 120 in the antenna assembly 10 are jointly used for realizing the LTE NR Double Connection (ENDC) of the 4G wireless access network and the 5G-NR in the first frequency range, the second frequency range and the third frequency range. Therefore, the antenna assembly 10 provided by the embodiment of the invention can realize ENDC and support 4G wireless access network and 5G-NR at the same time. Therefore, the antenna assembly 10 provided by the embodiment of the invention can improve the transmission bandwidth of 4G and 5G, improve the uplink and downlink speed, and has a better communication effect.

Figure 13:
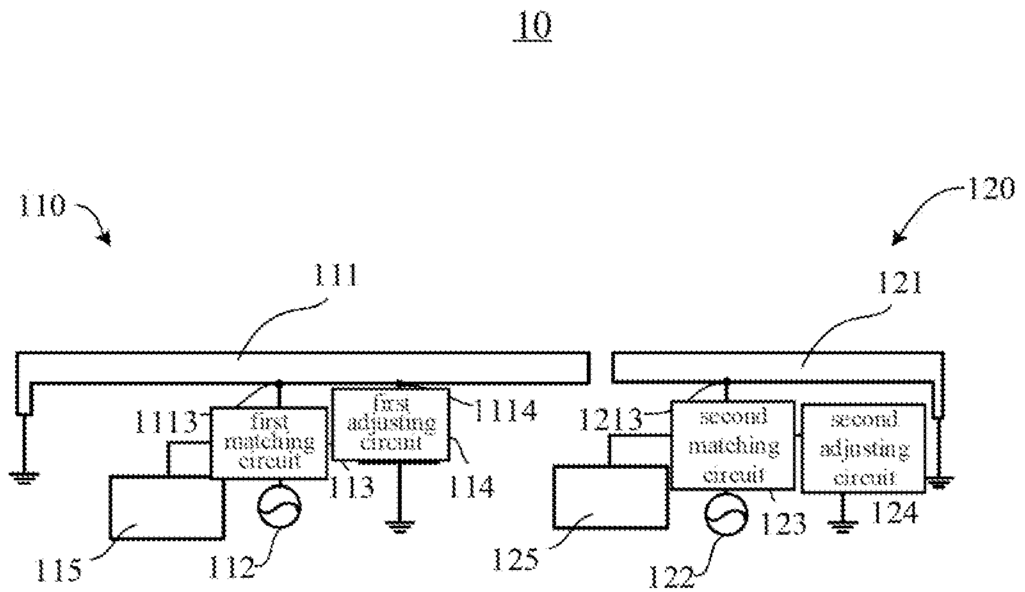
FIG. 13 is a schematic view of the antenna assembly in yet another embodiment of the present disclosure.

Referring to FIG. 13, FIG. 13 is a schematic view of the antenna assembly in yet another embodiment of the present disclosure. The first antenna 110 also includes a fourth radiator 115, which is electrically connected to the first matching circuit 113. The fourth radiator 115 is configured to generate at least one resonant mode to expand the bandwidth of the antenna assembly 10.

In this embodiment, taking the first antenna 110 including the fourth radiator 115, as an example, combined with the antenna assembly 10 shown in FIG. 8 of the previous embodiment for illustration.

Figure 14:
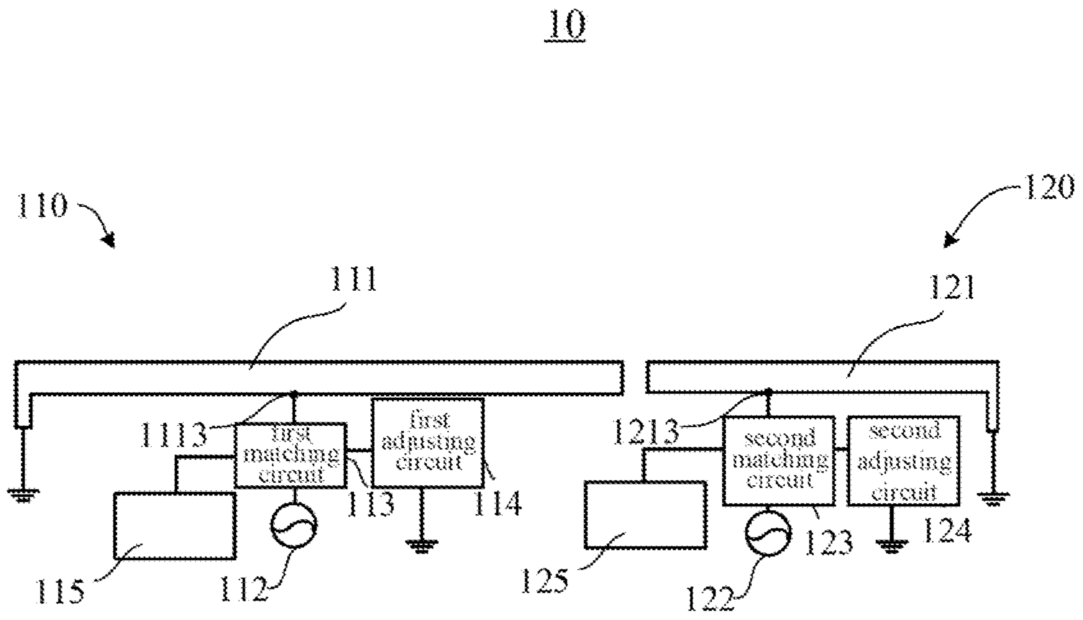
FIG. 14 is a schematic view of the antenna assembly in yet another embodiment of the present disclosure.

Referring to FIG. 14, FIG. 14 is a schematic view of the antenna assembly in yet another embodiment of the present disclosure. The structure of the antenna assembly 10 provided in this embodiment is basically the same as that of the antenna assembly 10 provided in FIG. 13 and related embodiments, except that in this embodiment, one end of the first adjustment circuit 114 is grounded and the other end is electrically connected to the first matching circuit 113. The antenna assembly 10 includes a first antenna 110 and a second antenna 120. The first antenna 110 includes the first radiator 111, the first signal source 112, the first matching circuit 113, the first adjusting circuit 114, and the fourth radiator 115. The first radiator 111 has a first feed point 1113, the first signal source 112 is electrically connected to the first feed point 1113 through the first matching circuit 113. One end of the first adjusting circuit 114 is grounded, and the other end of the first adjusting circuit 114 is electrically connected to the first matching circuit 113. The fourth radiator 115 is electrically connected to the first matching circuit 113. The second antenna 120 includes the second radiator 121, the third radiator 125, the second signal source 122, the second matching circuit 123, and the second adjusting circuit 124. The second radiator 121 and the first radiator 111 are spaced apart from each other and coupled to each other. The second radiator 121 has a second feed point 1213, the second signal source 122 is electrically connected to the second feed point 1213 through the second matching circuit 123, and the second signal source 122 is electrically connected to the third radiator 125 through the second matching circuit 123. One end of the second adjusting circuit 124 is grounded, and the other end of the second adjusting circuit 124 is electrically connected to the second matching circuit 123.

Figure 15:
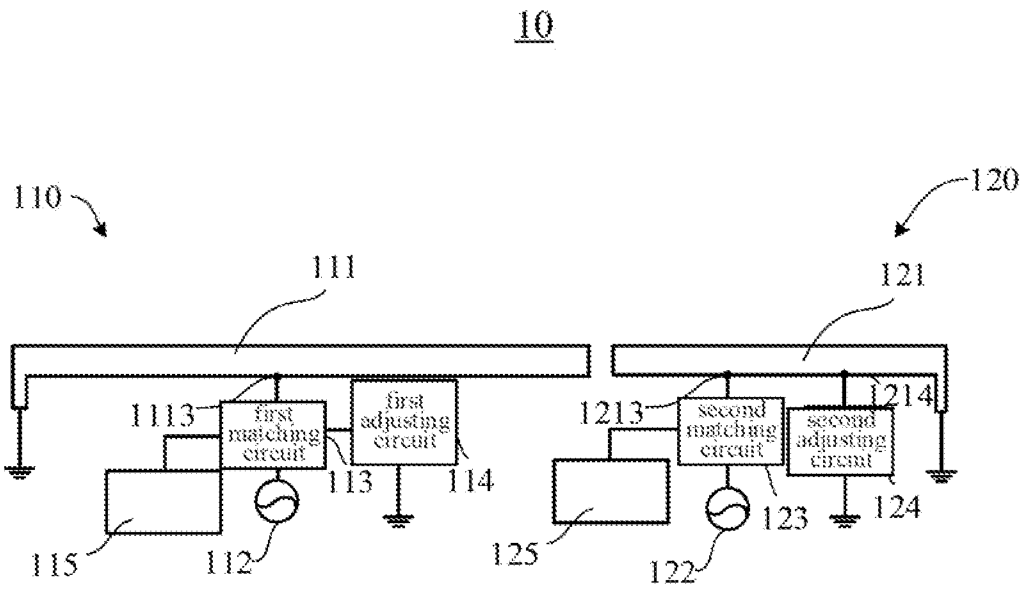
FIG. 15 is a schematic view of the antenna assembly in yet another embodiment of the present disclosure.

Referring to FIG. 15, FIG. 15 is a schematic view of the antenna assembly in yet another embodiment of the present disclosure. The structure of the antenna assembly 10 provided in this embodiment is basically the same as that of the antenna assembly 10 provided in FIG. 14 and related embodiments, except that in this embodiment, one end of the second adjusting circuit 124 is grounded, and the other end is electrically connected to the second connection point 1214. Specifically, the antenna assembly 10 includes the first antenna 110 and the second antenna 120. The first antenna 110 includes the first radiator 111, the first signal source 112 having the first feed point 1113, the first matching circuit 113, and the first adjusting circuit 114. The first signal source 112 is electrically connected to the first feed point 1113 through the first matching circuit 113. One end of the first adjusting circuit 114 is grounded, and the other end of the first adjusting circuit 114 is electrically connected to the first matching circuit 113. The fourth radiator 115 is electrically connected to the first matching circuit 113. The second antenna 120 includes the second radiator 121, the third radiator 125, the second signal source 122, the second matching circuit 123, and the second adjusting circuit 124. The second radiator 121 and the first radiator 111 are spaced apart from each other and coupled to each other. The second radiator 121 has a second grounding end 1211 and a second free end 1212. The second grounding end 1211 and the second free end 1212 are opposite ends of the second radiator 121. The second grounding end 1211 is grounded. The second free end 1212 and the end (first free ends 1112) of the first radiator 111 adjacent to the second radiator 121 are spaced apart from each other and coupled to each other. The second radiator 121 further has the second feed point 1213 and the second connection point 1214 between the second free end 1212 and the second ground end 1211. The second signal source 122 is electrically connected to the second feed point 1213 through the second matching circuit 123, and the second signal source 122 is electrically connected to the third radiator 125 through the second matching circuit 123. One end of the second adjusting circuit 124 is grounded, and the other end of the second adjusting circuit 124 is electrically connected to the second connection point 1214. In an embodiment, the second connection point 1214 is located between the second grounding end 1211 and the second feed point 1213.

Figure 16:
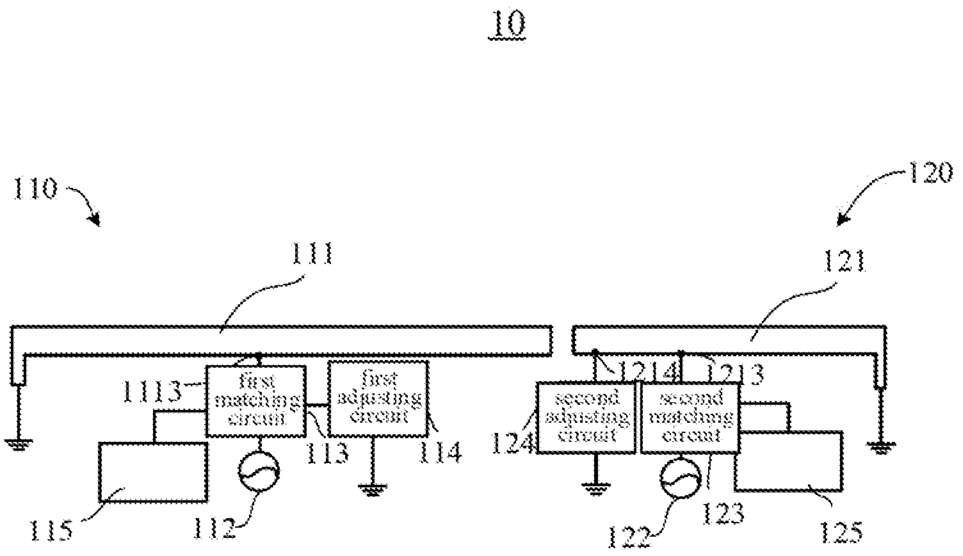
FIG. 16 is a schematic view of the antenna assembly in yet another embodiment of the present disclosure.

Referring to FIG. 16. FIG. 16 is a schematic view of the antenna assembly in yet another embodiment of the present disclosure. The structure of the antenna assembly 10 provided in this embodiment is basically the same as that of the antenna assembly 10 provided in FIG. 15 and related embodiments, except that in this embodiment, the second connection point 1214 is located between the second free end 1212 and the second feed point 1213. The antenna assembly 10 includes the first antenna 110 and the second antenna 120. The first antenna 110 includes the first radiator 111, the first signal source 112 having the first feed point 1113, the first matching circuit 113, and the first adjusting circuit 114. The first signal source 112 is electrically connected to the first feed point 1113 through the first matching circuit 113. One end of the first adjusting circuit 114 is grounded, and the other end of the first adjusting circuit 114 is electrically connected to the first matching circuit 113. The fourth radiator 115 is electrically connected to the first matching circuit 113. The second antenna 120 includes the second radiator 121, the third radiator 125, the second signal source 122, the second matching circuit 123, and the second adjusting circuit 124. The second radiator 121 and the first radiator 111 are spaced apart from each other and coupled to each other. The second radiator 121 has the second grounding end 1211 and the second free end 1212. The second grounding end 1211 and the second free end 1212 are opposite ends of the second radiator 121. The second grounding end 1211 is grounded. The second free end 1212 and the end (first free ends 1112) of the first radiator 111 adjacent to the second radiator 121 are spaced apart from each other and couple to each other. The second radiator 121 further has the second feed point 1213 and the second connection point 1214 between the second free end 1212 and the second ground end 1211. The second signal source 122 is electrically connects to the second feed point 1213 through the second matching circuit 123, and the second signal source 122 is further electrically connected to the third radiator 125 through the second matching circuit 123. One end of the second adjusting circuit 124 is grounded, and the other end of the second adjusting circuit 124 is electrically connected to the second connection point 1214. In this embodiment, the second connection point 1214 is located between the second free end 1212 and the second feed point 1213.

Figure 17:
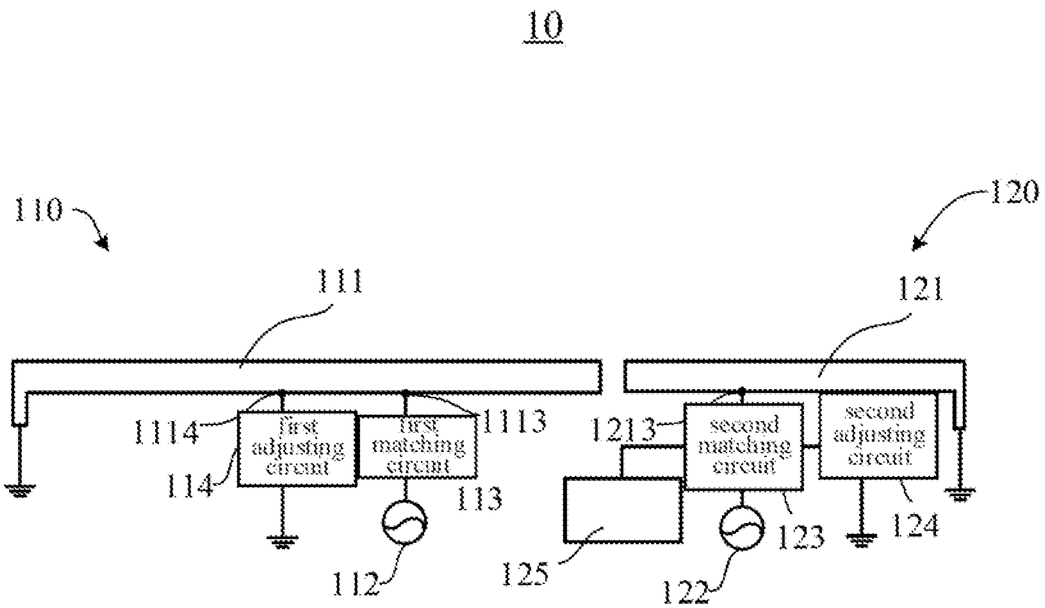
FIG. 17 is a schematic view of the antenna assembly in yet another embodiment of the present disclosure.

Referring to FIG. 17, FIG. 17 is a schematic view of the antenna assembly in yet another embodiment of the present disclosure. The structure of the antenna assembly 10 provided in this embodiment is basically the same as that of the antenna assembly 10 provided in FIG. 9 and related embodiments, except that in this embodiment, the first connection point 1114 is located between the first feed point 1113 and the first free end 1112. In this embodiment, the first connection point 1114 is located between the first feed point 1113 and the first grounding end 1111. The remaining structure of the antenna assembly 10 is described with reference to FIG. 14 and related embodiments thereof.

As can be seen from the various embodiments described above, the first adjusting circuit 114 in the first antenna 110 includes a manner that one end of the first adjusting circuit 114 is electrically connected to the first connection point 1114 and the other end is grounded; alternatively, one end of the first adjusting circuit 114 is electrically connected to the first matching circuit 113 and the other end is grounded. "One end of the first adjusting circuit 114 is electrically connected to the first connection point 1114 and the other end is grounded" includes the following situations: the first connection point 1114 is located between the first feed point 1113 and the first free end 1112; alternatively, the first connection point 1114 is located between the first feed point 1113 and the first grounding end 1111. The first antenna 110 may or may not include the fourth radiator 115. When the first antenna 110 includes the fourth radiator 115, the fourth radiator 115 is electrically connected to the first matching circuit 113.

When the first connection point 1114 is located between the first feeding point 1113 and the first free end 1112, the impact of the electromagnetic wave signal supported by the second resonant mode generated by the first radiator 111 on the electromagnetic wave signals of other frequency bands supported by the antenna assembly 10 can be reduced. The first connection point 1114 can also be located between the first feeding point 1113 and the first grounding end 1111, as long as the first regulating circuit 114 can be electrically connected to the first radiator 111.

The second adjusting circuit 124 in the second antenna 120 includes a manner that one end of the second adjusting circuit 124 is electrically connected to the second connection point 1214 and the other end is grounded; alternatively, one end of the second adjusting circuit 124 is electrically connected to the second matching circuit 123 and the other end is grounded. "One end of the second adjusting circuit 124 is electrically connected to the second connection point 1214 and the other end is grounded" includes the following conditions: the second connection point 1214 is located between the second feed point 1213 and the second free end 1212; alternatively, the second connection point 1214 is located between the second feed point 1213 and the second grounding end 1211.

When the second connection point 1214 is located between the second feed point 1213 and the second free end 1212, the impact of the electromagnetic wave signal generated by the second radiator 121 on the electromagnetic wave signals of other frequency bands supported by the antenna assembly 10 can be reduced. The second connection point 1214 can also be located between the second feed point 1213 and the second grounding end 1211, as long as the second adjusting circuit 124 can be electrically connected to the second radiator 121.

The antenna assembly 10 includes a combination of any one of the embodiments of the first antenna 110 and any one of the embodiments of the second antenna 120.

Figure 18:
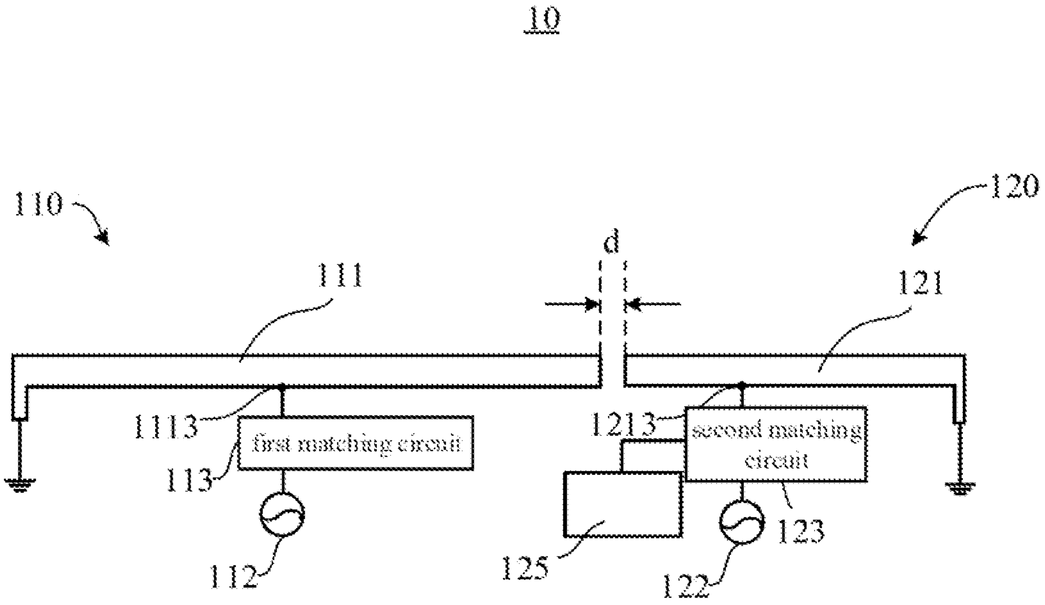
FIG. 18 is a schematic view of a size of a gap between a first radiator and a second radiator in the antenna assembly in an embodiment of the present disclosure.

Referring to FIG. 18, FIG. 18 is a schematic view of a size of a gap between the first radiator and the second radiator in the antenna assembly in an embodiment of the present disclosure. The size d of the gap between the first radiator 111 and the second radiator 121 satisfies; 0.5 mm≤d≤1.5 mm.

For the antenna assembly 10, the gap d between the radiator of the first antenna 110 and the radiator of the second antenna 120 in the antenna assembly 10 satisfies; 0.5 mm≤d≤1.5 mm, to ensure a better coupling effect between the first radiator 111 and the second radiator 121. Although the dimensions of the first radiator 111 and the second radiator 121 in the antenna assembly 10 are combined with the antenna assembly 10 shown in FIG. 2 as an example in this embodiment, it should not be understood as limiting the present disclosure. The gap between the first radiator 111 and the second radiator 121 also applies to the antenna assembly 10 provided by other embodiments.

Figure 19:
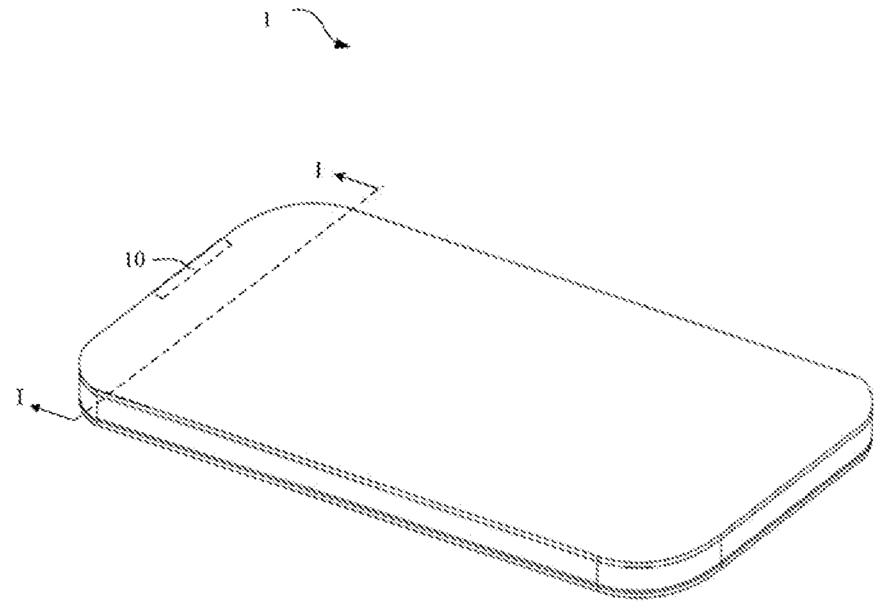
FIG. 19 is a three-dimensional schematic view of an electronic device in an embodiment of the present disclosure.

Referring to FIG. 19, FIG. 19 is a three-dimensional schematic view of an electronic device in an embodiment of the present disclosure. The electronic device 1 includes the antenna assembly 10 of any one of the foregoing embodiments.

Figure 20:
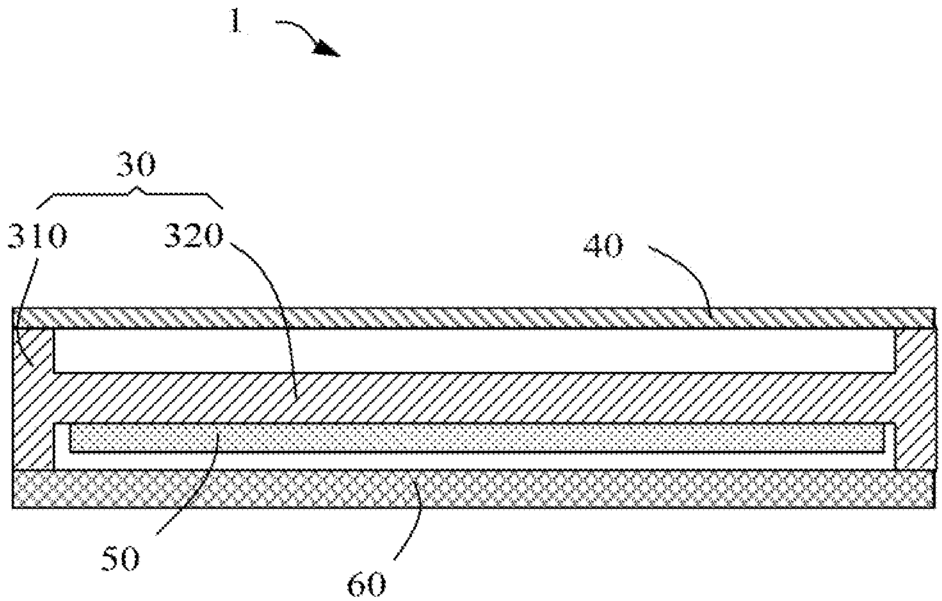
FIG. 20 is a cross-sectional schematic view of the line I-I of FIG. 19 in an embodiment of the present disclosure.

Referring to FIG. 20, FIG. 20 is a cross-sectional schematic view of the line I-I of FIG. 19 in an embodiment of the present disclosure. In this embodiment, the electronic device 1 also includes a middle frame 30, a screen 40, a circuit board 50 and a battery cover 60. The material of the middle frame 30 is metal, such as an aluminum magnesium alloy. The middle frame 30 typically constitutes the ground of the electronic device 1. When the electronic element in the electronic device 1 needs to be grounded, the middle frame 30 may be connected to ground. In addition, the ground system in the electronic device 1 includes not only the middle frame 30, but also the ground on circuit board 50 and the ground in screen 40. The screen 40 may be the display screen with the display function, or the screen 40 integrated with display and touch functions. The screen 40 is used for displaying information such as characters, images, videos and the like. The screen 40 is carried on the middle frame 30 and is located on one side of the middle frame 30. The circuit board 50 is usually also carried on the middle frame 30, and the circuit board 50 and the screen 40 are carried on two opposite sides of the middle frame 30. At least one or more of the first signal source 112, the second signal source 122, the first matching circuit 113, the second matching circuit 123, the first adjustment circuit 114, and the second adjustment circuit 124 in the antenna assembly 10 previously introduced can be provided on the circuit board 50. The battery cover 60 is arranged on the side of the circuit board 50 that is away from the middle frame 30. The battery cover 60, the middle frame 30, the circuit board 50, and the screen 40 cooperate with each other to assemble the complete electronic device 1. The structural description of electronic device 1 is only a description of one form of the structure of electronic device 1, and should not be understood as a limitation on electronic device 1, nor should it be understood as a limitation on antenna assembly 10.

When the first radiator 111 is electrically connected to the ground of the middle frame 30, the first radiator 111 can also be connected to the ground of the middle frame 30 through the connecting rib, alternatively, the first radiator 111 is also electrically connected to the ground of the middle frame 30 through the conductive elastic sheet. When the second radiator 121 is electrically connected to the ground of the middle frame 30, the second radiator 121 can also be connected to the ground of the middle frame 30 through the connecting rib, or the second radiator 121 is also electrically connected to the ground of the middle frame 30 through the conductive elastic sheet.

The middle frame 30 includes the frame body 310 and the frame 320, the frame 320 is bent and connected to the periphery of the frame body 310; and any one of the first radiator 111, the second radiator 121, the third radiator 131 and the fourth radiator 141 can be formed on the frame 320.

In other embodiments, the first radiator 111, the second radiator 121, the third radiator 131, and the fourth radiator 141 may also be formed on the frame 320; and may be an FPC antenna radiator, an LDS antenna radiator, a PDS antenna radiator, or a metal branch.

Figure 21:
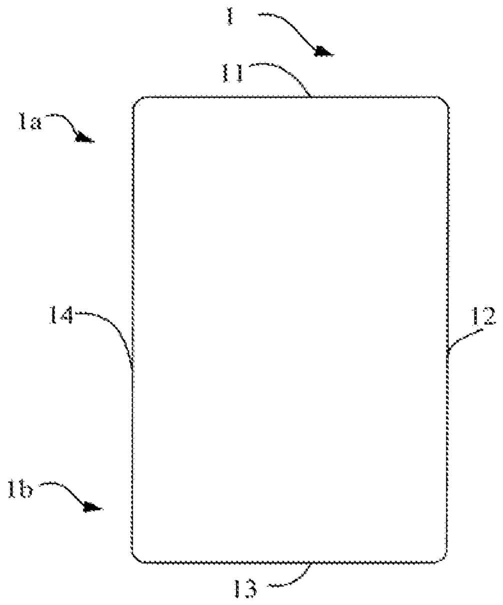
FIG. 21 is a schematic view of the position of the electronic device in an embodiment of the present disclosure.

Referring to FIG. 21, FIG. 21 is a schematic view of the position of the electronic device in an embodiment of the present disclosure. In the present embodiment, the electronic device 1 includes a top portion 1*a* and a bottom portion 1*b*, and the first radiator 111 and the second radiator 121 are both located on the top portion 1*a*.

The top portion 1*a* refers to the area located on the top of the electronic device 1 when in use. The bottom portion 1*b* is opposite to the top portion 1*a*, and is the area located on the bottom of the electronic device 1.

The electronic device 1 includes the first side 11, the second side 12, the third side 13 and the fourth side 14 which are sequentially connected end to end. The first side 11 and the third side 13 are short sides of the electronic device 1. The second side 12 and the fourth side 14 are long sides of the electronic device 1. The first side 11 and the third side 13 are opposite to each other and are spaced apart from each other. The second side 12 and the fourth side 14 are opposite to each other and are spaced apart from each other. The second side 12 is respectively connected to the first side 11 and the third side 13 in a bending way. The fourth side 14 is respectively connected to the first side 11 and the third side 13 in a bending way. The connection between the first side 11 and the second side 12, the connection between the second side 12 and the third side 13, the connection between the third side 13 and the fourth side 14, and the connection between the fourth side 14 and the first side 11 form the angle of the electronic device 1. The first side 11 is the top side, the second side 12 is the right side, the third side 13 is the bottom side, and the fourth side 14 is the left side. The angle formed by the first side 11 and the second side 12 is the top right corner, and the angle formed by the first side 11 and the fourth side 14 is the top left corner.

The top portion 1*a* includes three situations: the first radiator 111 and the second radiator 121 are disposed at the top left corner of the electronic device 1; alternatively, the first radiator 111 and the second radiator 121 are disposed on the top side of the electronic device 1; alternatively, the first radiator 111 and the second radiator 121 are arranged at the top right corner of the electronic device 1.

When the first radiator 111 and the second radiator 121 are arranged at the top left corner of the electronic device 1, the following situations are included: a portion of the first radiator 111 is located on the left side, the other portion of the first radiator 111 is located on the top side, and the second radiator 121 is located on the top side; alternatively, a portion of the second radiator 121 is located on the top side, another portion of the second radiator 121 is located on the left side, and the first radiator 111 is located on the left side.

When the first radiator 111 and the second radiator 121 are arranged at the top right corner of the electronic device 1, the following situations are included: a portion of the first radiator 111 is located on the top side, the other portion of the first radiator 111 is located on the right side, and the second radiator 121 is located on the right side; alternatively, a portion of the second radiator 121 is located on the right side, a portion of the second radiator 121 is located on the top side, and a portion of the first radiator 111 is located on the top side.

When the electronic device 1 is placed three-dimensionally, the top portion 1*a* of the electronic device 1 is generally facing away from the ground, and the bottom portion 1*b* of the electronic device 1 is generally close to the ground. When the first radiator 111 and the second radiator 121 are disposed on the top portion 1*a*, the upper hemispheres of the first antenna 110 and the second antenna 120 have good radiation efficiency, such that the first antenna 110 and the second antenna 120 have better communication efficiency. In other embodiments, the first radiator 111 and the second radiator 121 may also correspond to the bottom portion 1*b* of the electronic device 1. Although the upper hemisphere radiation efficiency of the first antenna 110 and the second antenna 120 is not so good when the first radiator 111 and the second radiator 121 are arranged corresponding to the bottom portion 1*b* of the electronic device 1, a better communication effect can be achieved as long as the upper hemisphere radiation efficiency is larger than or equal to a preset efficiency.

Figure 22:
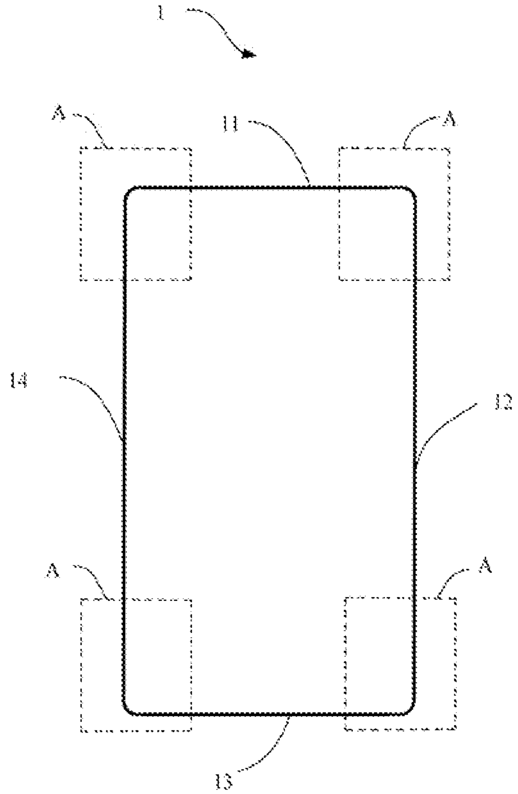
FIG. 22 is a schematic view of the position of the electronic device in another embodiment of the present disclosure.

Referring to FIG. 22, FIG. 22 is a schematic view of the position of the electronic device in another embodiment of the present disclosure. In the embodiment, the electronic device 1 includes a first side 11, a second side 12, a third side 13 and a fourth side 14 which are sequentially connected end to end. The first side 11 and the third side 13 are short sides of the electronic device 1, and the second side 12 and the fourth side 14 are long sides of the electronic device 1. The first side 11 and the third side 13 are opposite to each other and spaced apart from each other. The second side 12 and the fourth side 14 are opposite to each other and spaced apart from each other. The second side 12 is respectively connected with the first side 11 and the third side 13 in a bending mode, and the fourth side 14 is respectively connected with the first side 11 and the third side 13 in the bending mode. The joint of the first side 11 and the second side 12, the joint of the second side 12 and the third side 13, the joint of the third side 13 and the fourth side 14, and the joint of the fourth side 14 and the first side 11 form the angle A of the electronic device 1. The first radiator 111 and the second radiator 121 can be arranged corresponding to any angle of the electronic device 1. The first radiator 111 and the second radiator 121 are arranged corresponding to the same angle of the electronic device 1. When the first radiator 111 and the second radiator 121 are arranged corresponding to the angle of the electronic device 1, the efficiency of the first antenna 110 and the second antenna 120 is high. In an embodiment, taking the first side 11 and the third side 13 being the short sides of the electronic device 1, and the second side 12 and the fourth side 14 being the long sides of the electronic device 1 as an example. In other embodiments, the lengths of the first side 11, the second side 12, the third side 13, and the fourth side 14 are equal.

Although embodiments of the present disclosure have been shown and described above, it can be understood that the above embodiments are exemplary and cannot be understood as limitations to the present disclosure. Ordinary technical personnel in the art can make changes, modifications, substitutions, and modifications to the above embodiments within the scope of the present disclosure, and these improvements and embellishments are also considered within the scope of protection of the present disclosure.

What is claimed is:

1. An antenna assembly, comprising:

a first antenna comprising a first radiator, a first signal source, and a first matching circuit, wherein the first radiator has a first feed point, and the first signal source is electrically connected to the first feed point through the first matching circuit; and a second antenna comprising a second radiator, a third radiator, a second signal source and a second matching circuit, wherein the second radiator and the first radiator are spaced apart from each other and coupled to each other, the second radiator has a second feed point, the second signal source is electrically connected to the second feed point through the second matching circuit, the second signal source is electrically connected to the third radiator through the second matching circuit, and the first antenna and the second antenna jointly act to transmit and receive electromagnetic wave signals in at least one of a first frequency band range, a second frequency band range and a third frequency band range;

wherein the first antenna further comprises a first adjusting circuit configured to adjust a grounding impedance of the electromagnetic wave signals in the second frequency band range and the third frequency band range; and the first radiator has a first grounding end, a first free end and a first connection point; the first grounding end is grounded, the first connection point and the first feed point are arranged at intervals, and are arranged between the first free end and the first grounding end; one end of the first adjusting circuit is grounded, and the other end of the first adjusting circuit is electrically connected to the first connecting point; and the second radiator also comprises a second grounding end and a second free end, the second grounding end is grounded, and the second free end and the first free end are opposite to each other.

2. The antenna assembly as claimed in claim 1, wherein the first antenna is configured to transmit and receive electromagnetic wave signals in the first frequency band range, and the second antenna is configured to transmit and receive electromagnetic wave signals in the second frequency band range and the third frequency band range; and the first frequency band range comprises a lower band (LB) frequency band, the second frequency band range comprises a middle high band (MHB) frequency band, and the third frequency band range comprises an ultra high band (UHB) frequency band.

3. The antenna assembly as claimed in claim 2, wherein the antenna assembly has a first resonance mode, a second resonance mode, a third resonance mode and a fourth resonance mode to cover the transceiving of the electromagnetic wave signals in the second frequency band range and the third frequency band range.

4. The antenna assembly as claimed in claim 3, wherein at least one of the first resonance mode, the second resonance mode, the third resonance mode, and the fourth resonance mode is generated by the third radiator; and at least another resonance mode of the first resonance mode, the second resonance mode, the third resonance mode, and the fourth resonance mode is generated by coupling a portion of the first radiator with a signal from the second radiator.

5. The antenna assembly as claimed in claim 1, wherein when one end of the first adjusting circuit is grounded and the other end of the first adjusting circuit is electrically connected to the first connecting point, the first connecting point is arranged between the first grounding end and the first feeding point, or the first connecting point is arranged between the first feeding point and the first free end.

6. The antenna assembly as claimed in claim 1, wherein when one end of the first adjusting circuit is grounded and the other end of the first adjusting circuit is connected to the first connection point, the first resonance mode is generated from the second grounding end of the second radiator to the second free end, the second resonance mode is generated from the first connection point of the first adjusting circuit and the first radiator to the first free end, the third resonance mode is generated from the second feed point of the second radiator to the second free end, and the third radiator generates the fourth resonance mode.

7. The antenna assembly as claimed in claim 6, wherein the first resonance mode is a fundamental mode that the second antenna operates from the second grounding end to the second free end of the second radiator, the second resonance mode is a fundamental mode that the first antenna operates from the first connection point of the first adjusting circuit and the first radiator to the first free end, the third resonance mode is a fundamental mode that the second antenna operates from the second feed point of the second radiator to the second free end, and the fourth resonance mode is a fundamental mode that the second antenna operates in the third radiator.

8. The antenna assembly as claimed in claim 6, wherein the first adjusting circuit is configured to switch a frequency band supported by the first antenna in the first frequency band range.

9. The antenna assembly as claimed in claim 8, wherein the first adjusting circuit comprises a plurality of sub-adjusting circuits and a switch unit, the switch unit is electrically connected to the first connection point, the switch unit further electrically connects the plurality of sub-adjusting circuits to ground, and the switch unit electrically connects at least one of the plurality of sub-adjusting circuits to the first connection point under a control of a control signal.

10. The antenna assembly as claimed in claim 9, wherein the plurality of sub-adjusting circuits comprises at least one or more of capacitance, inductance, and resistance.

11. The antenna assembly as claimed in claim 8, wherein the frequency band supported in the first frequency band range comprises a B28 frequency band, a B20 frequency band, a B5 frequency band and a B8 frequency band; the first adjusting circuit is configured to enable the first antenna to operate in any one of the B28 frequency band, the B20 frequency band, the B5 frequency band and the B8 frequency band, and be switched in the B28 frequency band, the B20 frequency band, the B5 frequency band and the B8 frequency band.

12. The antenna assembly as claimed in claim 1, wherein the second antenna further comprises a second adjusting circuit, and the second adjusting circuit is configured to switch frequency bands supported by the second antenna in the second frequency band range and the third frequency band range.

13. The antenna assembly as claimed in claim 12, wherein one end of the second adjusting circuit is grounded and the other end is electrically connected to the second matching circuit;

or, the second radiator comprises a second grounding end, a second free end, the second feed point, and a second connection point; the second grounding end is grounded, the second free end and the first radiator are spaced apart from each other, and the second connecting point and the second feeding point are spaced apart from each other and are both arranged between the second free end and the second grounding end; and one end of the second adjusting circuit is grounded, and the other end of the second adjusting circuit is electrically connected to the second connecting point.

14. The antenna assembly as claimed in claim 13, wherein when one end of the second adjusting circuit is grounded and the other end is electrically connected to the second connecting point, the second connecting point is arranged between the second grounding end and the second feeding point, or the second connecting point is arranged between the second free end and the second feeding point.

15. The antenna assembly as claimed in claim 1, wherein the first antenna is configured to transmit and receive electromagnetic wave signals in the first frequency band range and the second frequency band range; the second antenna is configured to receive and transmit electromagnetic wave signals in the third frequency band range and a fourth frequency band range; the first frequency band range comprises a LB frequency band, the second frequency band range comprises a middle band (MB) frequency band, the third frequency band range comprises an UHB frequency band, and the fourth frequency band range comprises a high band (HB) frequency band;

or, the first antenna is configured to transmit and receive electromagnetic wave signals in the first frequency band range and the fourth frequency band range, and the second antenna is configured to transmit and receive electromagnetic wave signals in the second frequency band range and the fourth frequency band range;

or, the first antenna is configured to transmit and receive electromagnetic wave signals in the first frequency band range and the second frequency band range, and the second antenna is configured to transmit and receive electromagnetic wave signals in the third frequency band range;

or, the first antenna is configured to transmit and receive electromagnetic wave signals in the first frequency band range and the third frequency band range, and the second antenna is configured to transmit and receive electromagnetic wave signals in the second frequency band range.

16. The antenna assembly as claimed in claim 12, wherein the first adjusting circuit and the second adjusting circuit are co-modulated, so that the first antenna and the second antenna are jointly configured to implement LTE NR double connection (ENDC) or carrier aggregation (CA) of the first frequency band range, the second frequency band range and the third frequency band range.

17. The antenna assembly as claimed in claim 1, wherein the first antenna further comprises a fourth radiator electrically connected to the first matching circuit, wherein the fourth radiator is configured to generate at least one resonance mode.

18. An electronic device, comprising: a circuit board; and an antenna assembly, comprising:

a first antenna comprising a first radiator, a first signal source, and a first matching circuit, wherein the first radiator has a first feed point, and the first signal source is electrically connected to the first feed point through the first matching circuit; and a second antenna comprising a second radiator, a third radiator, a second signal source and a second matching circuit, wherein the second radiator and the first radiator are spaced apart from each other and coupled to each other, the second radiator has a second feed point, the second signal source is electrically connected to the second feed point through the second matching circuit, the second signal source is electrically connected to the third radiator through the second matching circuit, and the first antenna and the second antenna jointly act to transmit and receive electromagnetic wave signals in at least one of a first frequency band range, a second frequency band range and a third frequency band range;

wherein the first antenna further comprises a first adjusting circuit configured to adjust a grounding impedance of the electromagnetic wave signals in the second frequency band range and the third frequency band range; and the first radiator has a first grounding end, a first free end and a first connection point; the first grounding end is grounded, the first connection point and the first feed point are arranged at intervals, and are arranged between the first free end and the first grounding end; one end of the first adjusting circuit is grounded, and the other end of the first adjusting circuit is electrically connected to the first connecting point; and the second radiator also comprises a second grounding end and a second free end, the second grounding end is grounded, and the second free end and the first free end are opposite to each other;

wherein one or more of the first signal source, the second signal source, the first matching circuit, and the second matching circuit is provided on the circuit board.

* * * * *